3,577,256
SCRATCH AND ABRASION RESISTANT
COATINGS FOR GLASS
Charles L. Benford, Jr., and James E. Mielke, Toledo,
Ohio, assignors to Owens-Illinois, Inc.
No Drawing. Continuation of application Ser. No.
480,130, Aug. 16, 1965. This application June 26,
1969, Ser. No. 841,677
Int. Cl. C03c 17/32
U.S. Cl. 117—6                                                6 Claims

ABSTRACT OF THE DISCLOSURE

Freshly formed glass tubing is provided with a water soluble, scratch and abrasion resistant coating which may also be removed by volatilization at annealing temperatures. The coating is applied as an aqueous solution containing 0.5% to 2% of an acrylic solution resin, 0.75% to 1.5% polyoxyethylene glycol and 0.075% to 0.25% melamine-formaldehyde solution resin. The solution may also include 0.025% to 0.05% polyvinyl alcohol.

---

This application is a continuation of application Ser. No. 480,130, filed Aug. 16, 1965, now abandoned.

The present invention relates to scratch and abrasion resistant glass surfaces, and more particularly, to a method of imparting scratch and abrasion resistant coatings to glass surfaces. In one of its more particular aspects, the present invention relates to the treatment of freshly drawn glass tubing to impart thereto a scratch and abrasion resistant coating. In another of the more particular aspects of the present invention, a resinous coating is provided for glass surfaces which functions to provide protection against scratches and abrasion.

Glass derives a major proportion of its strength from a scratch and crevice free surface. Maximum strength of glass articles is developed very shortly after formation and the protection of the glass against scratches at this stage caused by coming into contact with other glass surfaces is an important objective in the glass industry. Frequently, as much as one fourth of the strength of the glass is lost because of scratches and abrasions that occur on the surface thereof. In addition, of course, the appearance of the glass article is adversely affected by scratches.

In the manufacture of various articles such as tubing, protection against scratches and abrasion is particularly desirable immediately after the tubing is drawn. Tubing used for manufacture into pharmaceutical ampules, for example, must be protected from scratches in order to be acceptable for packaging the final product. Many other tubular glass articles require protection of a similar nature. One such item is the neck portion of the TV envelope. Scratches in the neck portion may be sufficient grounds for rejection of the entire TV tube. It will be seen therefore that undesirable scratches, abrasions and the like can be extremely costly in terms of rejects and breakage.

In certain applications, the protective coating need not be present at subsequent handling operations, or may only be desired at selected stages in the overall operation, hence it is desirable to obtain a protective coating which adequately protects the glass surface, and after serving its intended function, may then be removed, if desired.

Various attempts have been made to obtain satisfactory coatings on glass surfaces, particularly glass tubing. These prior methods have taken the form of very lubricious coatings which produce excellent lubricity but are insufficient to protect against scratching when relatively high pressures are encountered. Harder films have also been attempted, however, these have the disadvantage and drawback of becoming easily scuffed and eroded.

Accordingly, it is an object of the present invention to provide scratch and abrasion resistant coatings for glass surfaces.

It is a further object of the present invention to provide a method for imparting scratch and abrasion resistance to glass surfaces.

It is a further object of the present invention to provide resinous coatings for glass surfaces to impart scratch and abrasion resistance thereto.

It is a further object of the present invention to provide a method for imparting scratch and abrasion resistance to glass tubing.

It is a further object of the present invention to provide a method for protectively coating glass surfaces to resist scratches and abrasion, which coatings may be subsequently removed if desired.

It is a still further object of the present invention to provide scratch and abrasion resistant glass surfaces.

In attaining the above objects, one feature of the present invention resides in applying to the surface of a glass article an aqueous mixture containing an acrylic solution resin in sufficient amounts to impart scratch and abrasion resistance to said surface.

Another feature of the present invention resides in applying to the surfaces of glass articles an aqueous mixture comprising an acrylic solution resin, polyoxyethylene glycol, melamine formaldehyde solution resin and polyvinyl alcohol in a sufficient amount to impart scratch and abrasion resistance to said glass surface.

Another feature of the present invention resides in applying to a glass tubing an aqueous mixture comprising an acrylic solution resin polyoxyethylene glycol, melamine formaldehyde solution resin and polyvinyl alcohol in sufficient amounts to impart scratch and abrasion resistance to said glass tubing.

Another feature of the present invention resides in glass tubing protectively coated to prevent scratching and abrasion and having adhered to the surface thereof a composition comprising an acrylic solution resin, polyoxyethylene glycol, melamine formaldehyde solution resin and polyvinyl alcohol.

The above as well as other objects, features and advantages of the present invention will become apparent from the following detailed description thereof.

In carrying out the present invention, a glass surface is treated, while at a temperture not substantially greater than about 500° F. by spraying with an aqueous mixture comprising an acrylic solution resin, polyoxyethylene glycol, such as has an average molecular weight from 15,000 to 20,000 and melamine formaldehyde solution resin. The vehicle forming the remainder of the mixture is generally water. Most preferably the mixture is in the form of an aqueous solution that can be readily applied by spraying, although other suitable means of application may be used.

According to a more particular aspect of the invention, freshly drawn glass tubing is sprayed while the surface thereof is at a temperature not substantially in excess of 500° F. with an aqueous solution comprising an acrylic solution resin, polyoxyethylene glycol having an average molecular weight of 15,000 to 20,000 and melamine formaldehyde solution resin.

In carrying out a still more particular aspect of the present invention, polyvinyl alcohol is added to the composition containing the acrylic solution resin, Carbowax, and melamine formaldehyde resin.

Acrylic solution resins are generally polymers or copolymers of lower alkyl acrylates or methacrylates. Representative acrylic solution resins suitable for purposes of the present invention include ethyl acrylate, methylmethacrylate and the like. Commercially available acrylic resins that may be used for purposes of the present invention include Carboset 511 made by B. F. Goodrich Chemical Co. and the ethylacrylate and methylmethacrylate polymers sold by Polymer Research Industries of Brooklyn, N.Y.

Polyoxyethylene glycol may be represented by the structural formula:

$$HO(CH_2CH_2O)_xH$$

where the average molecular weight may range from about 15,000 to 20,000. These limits may vary, however. Many suitable commercially available materials may be used such as the Carbowax series sold by Union Carbide, e.g. Carbowax 20M.

Another component of the compositions of the present invention is melamine formaldehyde solution resin. Several commercially available forms of this material may be used. The Cymel and Arotex resins made by American Cyanamid are suitable for this purpose.

A still further component of the scratch resistant coatings described herein is polyvinyl alcohol resin and which is used in small amounts generally from 0.025% to 0.05% although the amount used may vary.

Protective coatings for glass surfaces must possess several properties of principal importance in that the film must prevent or materially reduce scratches and abrasion marks. Generally, the film must be clear and preferably brilliant. Moreover, the films must be highly transparent so as not to be readily apparent on the surface of the glass.

It has been observed and determined that the protective films produced according to the present invention possess the above characteristics. In addition, the protective coatings of the present invention are particularly valuable for the coating of tubular glass. By selection of particular components and proper proportions, the coatings of the present invention can be made so as to be water-soluble and volatilizable at temperatures used in annealing lehrs.

In the manufacture of tubular glass, it is desirable to protect the freshly drawn tubing immediately after leaving the pulling machines when the surface of the glass is at a temperature of approximately 300–500° F. It is desirable that the glass tubing be protected from this drawing stage to the annealing lehr. During the annealing stage it is permissible for the protective coating to burn off.

Films produced according to the process described herein have the advantage of being of a relatively hard type and thus represent a departure from the previous efforts to protectively coat glass surfaces which involved largely the application of lubricious and relatively soft coatings exhibiting poor performance at higher pressures.

The following examples will serve to illustrate the present invention but are not intended as limiting thereof in any way.

EXAMPLE I

The following composition was prepared containing the indicated ingredients in percent by weight:

1% ethylacrylate polymer
1.25% polyoxyethylene glycol (Carbowax 20M)
.05% melamine formaldehyde resin (Cymel 7273)
97.7% water

EXAMPLE II

The following composition was prepared containing the indicated ingredient in percent by weight:

1% methylmethacrylate polymer
1.25% polyoxyethylene glycol (Carbowax 20M)
0.05% melamine formaldehyde resin (Cymel 7273)
97.7% water

EXAMPLE III

The following examples are illustrative of the polyvinyl alcohol-containing composition:

1.25% polyoxyethylene glycol (Carbowax 20M)
1% ethylacrylate solution resin
0.05% melamine formaldehyde solution resin
0.025% polyvinyl alcohol

EXAMPLE IV 1.5% polyoxyethylene glycol
2.0% ethylacrylate solution resin
0.25% melamine formaldehyde solution resin
0.05% polyvinyl alcohol In applying the coating compositions of the present invention, the glass surface is most conveniently sprayed with the aqueous solution by means of any suitable spraying nozzle. A hard, tough protective coating for tubing will be obtained according to the present invention. The film meets the criteria of preventing scratches and abrasion marks; it is clear and brilliant; the coatings can be made to burn off in the lehr; the film does not create problems in future processing of the treated article; the film can be applied at temperatures existing at the pulling machines, e.g. 300–500° F.; the film may be water soluble, and the presence of the film on the surface of the article is not readily apparent.

In the tests conducted to ascertain the effectiveness of the coatings, the tubing used was KG–12, 1⅛ inch in diameter TV necks cut to 6 inch length. Preliminary screening of coatings was done using a simple hand rub test. A piece of tubing was grasped in each hand and rubbed, applying a minimum of pressure until the coating broke down and the tubing was scratched. Coatings that withstood 200 rubs were then subjected to rubbing under pressure by coating bottles and tested on a scratch tester specially developed for testing protective coatings on bottles.

The thickness of the applied coating was regulated by limiting the time the tubing remained in the spray or by changing the concentration of the spray solution. Under plant conditions, the tube drawing speed can be set to maintain tube dimensions and the tubing will remain in the spray zone for fractions of a second. Film thickness will then be a function of the concentration of the spray solution. It has been determined that a concentration of about 3.8% provides a satisfactory coating; however, lesser or greater amounts may also be used without departing from the scope of the invention. The concentration is not narrowly critical, sufficient amount being used so as to provide acceptable protection. The upper limit to concentration is a protection factor that will be determined by economics.

Proportions of the various components of the scratch resistant coatings of the present invention can vary over a considerable range. Suitable proportions for the acrylic resin are 0.5% to 2%; 0.75% to 1.5% polyoxyethylene glycol; 0.075% to .25% melamine formaldehyde resin and, when added, 0.025% to 0.05% polyvinyl alcohol. All percentages are based on the weight of the total aqueous mixture.

For the purpose of adjudging the efficiency of various other coating materials the following tests were conducted. Using 0.5% water solution, the solutions were sprayed on tubing.

TABLE I

| | Compound | Number of times abraded | Remarks |
|---|---|---|---|
| 1 | Hydroxyethylcellulose | 4 | Glass scratched. |
| 2 | Cellulose ether | 100 | Coating scuffed, not scratched. |
| 3 | Methyl vinyl ether/maleic anhydride copolymer. | 4 | Scratched. |
| 4 | Polyvinyl alcohol | 150 | Slippery, not scratched. |
| 5 | Acrylic resin | 100 | Scuffed, scratched. |
| 6 | Vinyl acrylic emulsion | 10 | Do. |
| 7 | Polyoxyethylene stearate | 70 | Scratched. |
| 8 | Polyoxyethylene sorbitan monooleate. | 50 | Do. |

The following tests were conducted employing compositions representative of the present invention for the purpose of determining scratch resistance. The coatings were applied to bottles and tested in the special scratch test instrument.

| Solution composition | Test results, lbs. pressure | Remarks |
|---|---|---|
| 1 -- { 1.5% polyoxyethylether glycol (Carbowax 20M). 2.0% acrylic solution resin (Carboset 511). 0.25% melamine formaldehyde resin (Cymel 7273). 0.05% polyvinyl alcohol. | 100 plus | Coating not marred, glass not scratched. |
| 2 -- { 1.25% polyoxyethylene glycol. 1.0% acrylic solution resin (Carboset 511). 0.05% melamine formaldehyde resin (Cymel 7273). 0.025% polyvinyl alcohol. | ---do------ | Do. |

The above data illustrates the superiority of the coatings produced in accordance with the present invention for the purpose of imparting scratch resistance.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

We claim:

1. A method for forming a water removable, scratch and abrasion resistant coating on the surface of freshly formed glass tubing, which coating is also removable by volatilization at annealing temperatures, said method comprising treating said surface while at a temperature not substantially greater than 500° F. with an aqueous solution consisting essentially of, in parts by weight, about 0.5% to about 2% of an acrylic solution resin that is a polymer or copolymer of lower alkyl acrylates or lower alkyl methacrylates, about .75% to about 1.5% polyoxyethylene glycol having a molecular weight in the range of about 15,000 to about 20,000, and about .075% to about .25% melamine-formaldehyde solution resin.

2. The method of claim 1 wherein said alkyl is methyl or ethyl.

3. The method of claim 2 wherein said aqueous solution further includes about .025% to about .05% polyvinyl alcohol.

4. As an article of manufacture, glass tubing having directly adhered to its surface a coating that imparts scratch and abrasion resistance thereto, said coating consisting essentially of the reaction product, in parts by weight, of about 0.5% to about 2% of an acrylic solution that is a polymer or copolymer of lower alkyl acrylates or lower alkyl methacrylates, about 0.75% to about 1.5% polyoxyethylene glycol having a molecular weight of about 15,000 to about 20,000 and about .075% to about .25% melamine formaldehyde solution resin, said coating being water removable and removable by volatilization at annealing temperatures.

5. The article of claim 4 wherein said alkyl is methyl or ethyl.

6. The article of manufacture of claim 5 wherein said coating is the reaction product of the ingredients of claim 5 and about .025% to about .05% polyvinyl alcohol.

References Cited

UNITED STATES PATENTS

| 3,296,174 | 1/1967 | Pickard | 117—124(D) |
| 3,352,707 | 11/1967 | Pickard | 117—72 |
| 3,355,314 | 11/1967 | Gagnon et al. | 117—72 |

ALFRED L. LEAVITT, Primary Examiner

W. F. CYRON, Assistant Examiner

U.S. Cl. X.R.

117—94, 124, 161